United States Patent Office 3,015,776
Patented Jan. 2, 1962

3,015,776
INDICATING FLUCTUATIONS IN FREQUENCY
AND AMPLITUDE
Heinz Matüsche, Munich, Germany, assignor to Sud Atlas-Werke G.m.b.H., Munich, Germany
Filed Dec. 30, 1957, Ser. No. 706,014
Claims priority, application Germany Feb. 9, 1957
10 Claims. (Cl. 324—82)

The invention relates to a method for indicating fluctuations of frequency and amplitude, especially of a sound recorded on a phonograph, a sound-tape apparatus or a dictaphone. In such apparatus uniform drive of the sound carrier must be ensured because otherwise the quality of the reproduction of the sound recordings will be impaired by fluctuations in frequency and amplitude (so-called "wailing"). The arrangements heretofore known for measuring frequency and amplitude fluctuations are not suitable for indicating these fluctuations reliably and with sufficient accuracy when they occur simultaneously, which is frequently the case in practice. Thus, for example, known devices such as phase discriminators for indicating fluctuations in frequency are open to the objection that they only ensure accurate indication of such frequency fluctuations when they are fed with an input voltage having a constant amplitude.

The present invention has for its object to provide for accurate measurement of frequency and amplitude fluctuations of a recorded and reproduced sound even when these fluctuations occur simultaneously and can no longer be heard or distinguished by ear. This object is attained according to the invention by deriving from a voltage to be tested four mutually displaced resonance curves, preferably having the same shape or course, with the aid of four resonance circuits tuned to different frequencies within a selected frequency fluctuation range. Each two resonance curves belonging to non-adjacent resonance frequencies are united to produce, after rectification, first and second continuous deflecting voltages for a pair of plates of a cathode-ray tube, which voltages, according to frequency, pass through a positive and a negative maximum and are mutually displaced in such a manner that the positive maximum of the second continuous voltage corresponds to the passage through zero of the first continuous voltage and the negative maximum of the first continuous voltage corresponds to the passage through zero of the second continuous voltage. As a result, fluctuations in frequency and amplitude cause mutually different deflections of the light spot on the cathode-ray tube. An input voltage having constant amplitude but variable frequency produces an arcuate deflection of the light spot on the cathode-ray tube, whereas an input voltage with constant frequency but variable amplitude produces a radial deflection of the light spot. Therefore, if the input voltage has both frequency and amplitude fluctuations, an area is lighted up on the cathode-ray tube, the dimensions of which in the peripheral direction and in the radial direction are indicative of the fluctuations in frequency and in amplitude, respectively.

A preferred embodiment of the invention is illustrated by way of example in the accompanying drawings, in which.

Figure 1:
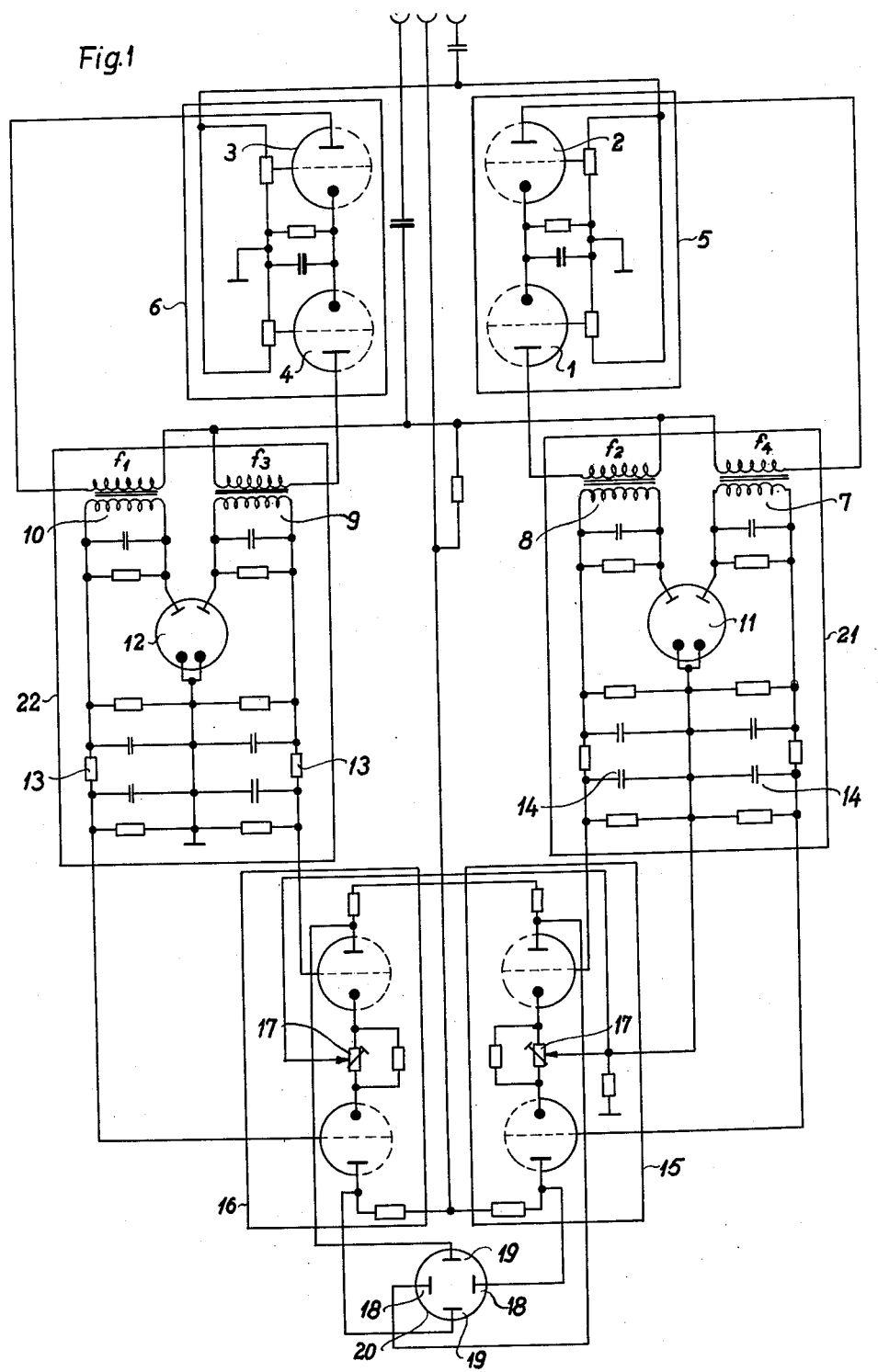
FIG. 1 is a circuit diagram of an instrument for carrying out the method according to the invention.

Referring now particularly to FIG. 1, the voltage delivered by the sound head or pick-up of a sound recording or reproducing apparatus, not shown, is transmitted parallel to the inputs of four separate amplifier channels with tubes 1, 2, 3, 4 united in pairs to form double-channel amplifiers 5 and 6 with a common cathode resistance. Resonance circuits 7, 8, 9, 10, which are tuned to different frequencies $f_1$, $f_2$, $f_3$ and $f_4$, are connected to the positive electrodes of the tubes 1, 2, 3, 4, whereby the condition $$\log f_2 - \log f_1 = \log f_3 - \log f_2 = \log f_4 - \log f_3$$

is preferably complied with. In the present instance the resonance frequencies amount to $f_1=900$, $f_2=950$, $f_3=1000$ and $f_4=1050$ cycles per second. The alternating voltages occurring are rectified by two diodes 11, 12 and counter-connected in pairs. In each channel there is a filter element comprising a resistance 13 of 200 kΩ and a condenser 14 of 0.01 μf. After filtering, a continuous voltage is produced in each pair of channels, which is very low to earth so that the summation of the anode currents of the following four continuous-current amplifier stages is constant. The continuous voltages thus formed are, after being amplified in double-channel continuous-current amplifiers 15, 16 with potentiometers 17 serving for zero adjustment of the light spot on a cathode-ray tube 20, fed to pairs of plates 18 and 19 of the cathode-ray tube 20 as deflection voltages $U_x$ and $U_y$.

Figure 2:
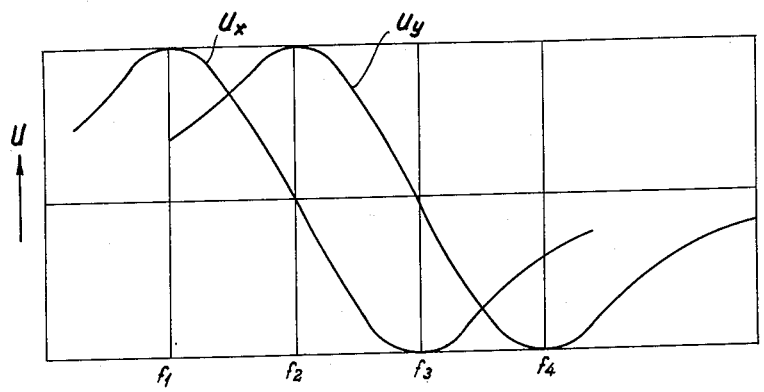
FIG. 2 is a diagram illustrating deflection voltages produced by the instrument according to FIG. 1 and applied to a cathode-ray tube.

The resonance circuits 7, 8, 9 and 10 and diodes 11, 12 form two discriminators 21, 22 in which alternating voltages from two resonance circuits are rectified and counter-connected in known manner. If care is taken that, with constant input voltage to the discriminator, the voltages supplied by the resonance circuits are the same in both resonance points, a curve is obtained as discriminator output voltage dependent upon the frequency, which, as can be seen from FIG. 2, after rising to a maximum drops steeply, passes through zero, attains a negative maximum and then returns towards zero. When the resonance circuits are suitably damped and the input potentiometers are suitably dimensioned, it is possible to attain a curve for the discriminator voltage between the two maxima which is of substantial sine shape. In this case an arcuate or nearly arcuate deflection is obtained for the light spot on the cathode-ray tube, dependent upon the frequency. The curves shown in FIG. 2 are commonly referred to as S-curves and have a generally straight portion separating a maximum and a minimum. Maximum and minimum as used herein without reference to polarity refer to points on the curve where the derivative with respect to frequency is zero.

Figure 3:
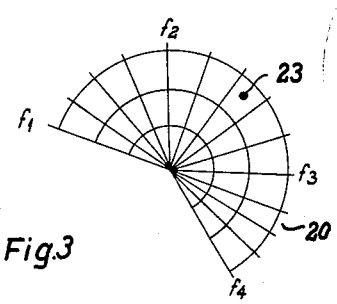
FIGS. 3, 4, 5 and 6 are diagrammatic showings of indications or signs on the cathode-ray tube for some characteristic cases.

The time constants of the rectifier circuits are tuned according to the actual circumstances. They determine the maximum fluctuation frequency which can be indicated properly. FIGS. 3 to 6 show four characteristic cases of indications or readings on the cathode-ray tube. FIG. 3 illustrates the ideal case of absolute synchronism of the audio apparatus tested, with no fluctuations in frequency or amplitude. The cathode-ray tube indicates on its screen a perfect light spot 23 which is not deflected either in circumferential or in radial direction with respect to said screen.

Figure 4:
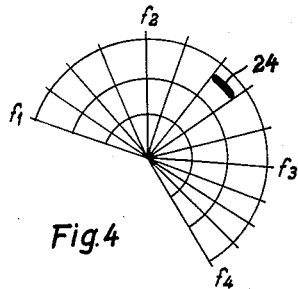

FIG. 4 illustrates the case of a fluctuation in frequency but with constant amplitude. The light spot is deflected only in circumferential direction so that an arcuate indication or reading 24 is produced.

Figure 5:
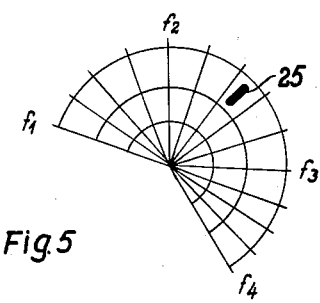

FIG. 5 illustrates the case of amplitude fluctuation with the frequency being constant. This condition is indicated by a line or dash 25 extending radially of the screen.

Figure 6:
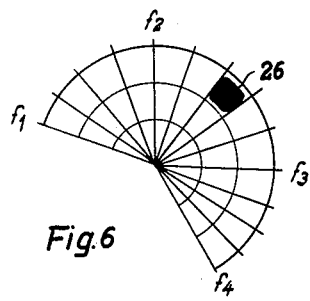

Finally, FIG. 6 shows the case where there is combined frequency and amplitude fluctuation with simultaneous circumferential and radial deflection of the light spot, resulting in an illuminated area 26 on the screen of the cathode-ray tube. The extent of this area 26 in the circumferential direction of the screen corresponds to the frequency fluctuation and in the radial direction to the amplitude fluctuation.

The arrangement is preferably such that the light spot 23, in the case of ideal synchronism, is located substantially in the middle of an indicator field extending over somewhat less than three quarters of a circle. The screen of the cathode-ray tube may be provided with a polar coordinate grid system to facilitate the reading of the magnitude of fluctuation in frequency and amplitude. In this polar diagram any frequency between $f_1$ and $f_4$ can be coordinated to an angle and any amplitude to a radius, so that frequency and amplitude can be clearly indicated.

The cathode-ray tube includes a control electrode of known type which may be closed and opened at regular intervals of time with the aid of impulses or square-wave voltages, so that certain information concerning the time slope of the fluctuations can also be obtained.

After adjustment to make the plate deflection voltages $U_x$ and $U_y$ sinusoidal for a constant input amplitude, the angular coordinate system is unambiguously linked to the frequency even when the amplitude of the input voltage varies, because the relationship between the deflection voltages $U_x$ and $U_y$ is independent of the input amplitude and defined in rectangular coordinates by a straight line passing through the origin.

Numerous modifications and also other forms of construction are possible within the scope of the invention: in particular provisions can be made for recording the frequency and amplitude fluctuations. The method according to the invention possesses a number of advantages over frequency measuring instruments and synchronism testing instruments indicating by means of pointer devices, in that there are no mechanical time constants to introduce errors in the indication of the frequency fluctuations.

I claim:

1. A method of simultaneously indicating fluctuations in amplitude and frequency upon the screen of a cathode ray tube which method includes the steps of, introducing a voltage to be tested into two discriminators characterized by frequency response characteristics wherein at a first frequency one of said discriminators provides a maximum positive response while the other provides substantially zero response and at a second frequency said one discriminator provides substantially zero response while said other discriminator provides a maximum negative response, and applying the output signals derived from said discriminators to the vertical and horizontal deflection plates respectively of said cathode ray tube.

2. A method as set forth in claim 1 which further comprises damping the resonance circuits to produce a substantially sine-shaped course of the deflection voltages between their positive and negative maxima.

3. A method as set forth in claim 1, which further comprises applying an impulse voltage to a control electrode of the cathode-ray tube to effect brightness control.

4. A method as set forth in claim 1, which further comprises applying a square-wave voltage to a control electrode of the cathode-ray tube to effect brightness control.

5. A method of simultaneously detecting frequency and amplitude fluctuations of an input signal which method includes the steps of applying said input signal to the inputs of a pair of discriminators, one having a frequency response characteristic which is substantially zero at a first frequency and a maximum at a second frequency, the other having a frequency response characteristic which is zero at said second frequency and a minimum at said first frequency, and combining the output signals from said discriminators.

6. A method of simultaneously displaying frequency and amplitude fluctuations of an input signal which method includes the steps of applying said input signal to the input of a pair of discriminators, one having a frequency response characteristic which is substantially zero at a first frequency and a positive maximum at a second frequency, the other having a frequency response characteristic which is zero at said second frequency and a negative maximum at said first frequency, and deflecting indicating means in mutually orthogonal directions in accordance with the amplitude of the output signals from said one and other discriminators respectively.

7. Apparatus for simultaneously providing an indication of frequency and amplitude variations of an input signal comprising, a pair of frequency sensitive means having frequency response characteristics of like S-shape but displaced in frequency such that one of said characteristics is a maximum at a frequency substantially midway between the frequencies where the other of said characteristics is a maximum and a minimum, means for applying said input signal to the inputs of both said frequency sensitive means, and means for combining the output signals derived from said pair of frequency sensitive means.

8. Apparatus in accordance with claim 7 wherein said combining means includes a cathode ray tube having vertical and horizontal deflection plates, and means for coupling one of said output signals to said horizontal plates and the other to said vertical plates.

9. Apparatus for simultaneously providing an indication of frequency and amplitude variations of an input signal comprising, a pair of frequency modulation detectors having frequency response characteristics each exhibiting a positive and a negative peak separated by the same frequency difference in both said detectors, the magnitude of each of said peaks being substantially equal, each characteristic having an S-shaped portion which crosses the frequency axis midway between the associated positive and negative peak frequencies and coinciding substantially with one of the peak frequencies of the other characteristic, means for applying said input signal to the inputs of both said detectors, and indicator means connected to the outputs of said detectors for orthogonally combining the output signals from said detectors.

10. Apparatus in accordance with claim 9 wherein said combining means includes a cathode ray tube having vertical and horizontal deflection plates, and means for coupling one of said output signals to said horizontal plates and the other to said vertical plates.

References Cited in the file of this patent

UNITED STATES PATENTS

| | | |
|---|---|---|
| 2,233,751 | Seeley | Mar. 4, 1941 |
| 2,266,040 | Hoover | Dec. 16, 1941 |
| 2,343,633 | Baldwin | Mar. 7, 1944 |
| 2,541,667 | Jaynes | Feb. 13, 1951 |
| 2,576,249 | Barney | Nov. 27, 1951 |
| 2,594,091 | Summerhayes | Apr. 22, 1952 |
| 2,602,837 | Foster | July 8, 1952 |
| 2,613,271 | Trevor | Oct. 7, 1952 |
| 2,653,019 | Dreisbach | Sept. 22, 1953 |
| 2,662,126 | Henson | Dec. 8, 1953 |
| 2,762,013 | Chandler | Sept. 4, 1956 |